Patented Sept. 14, 1954

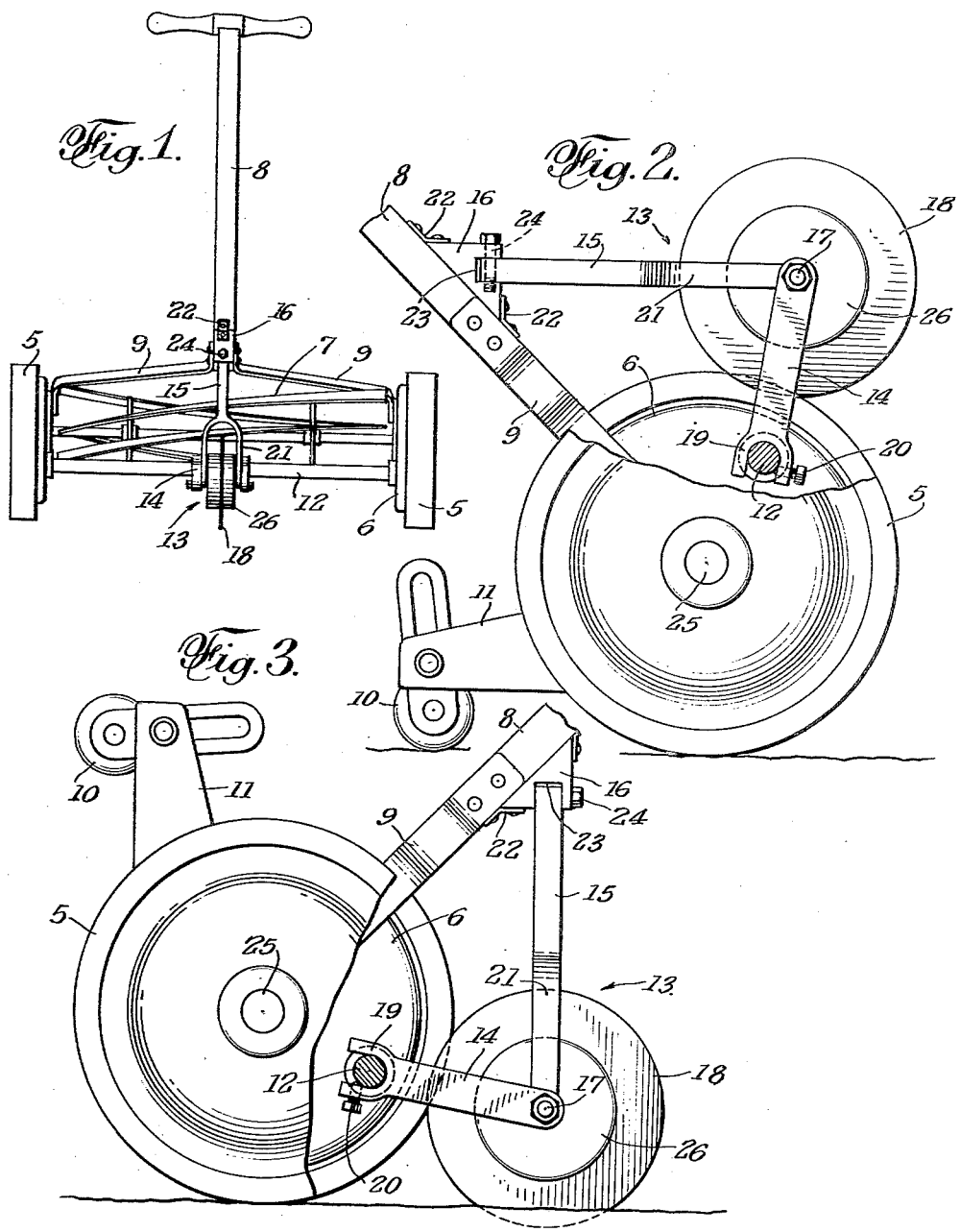

2,688,836

UNITED STATES PATENT OFFICE 2,688,836

LAWN MOWER WITH EDGE TRIMMER

Fay R. Hopkins, Glendale, Calif.

Application October 4, 1952, Serial No. 313,099

1 Claim. (Cl. 56—251)

This invention relates to a trimmer for the edges of lawns and comprises a tool that is mounted on and, therefore, combined with a lawn mower.

An object of the present invention is to provide an edge-trimming tool that is fixedly mounted between, above, and forward of the wheels of a lawn mower to be adapted, when the mower is inverted to be in operative edge-cutting position while the operating handle of the mower is presented at substantially the same angle as its angle of presentation before the mower was inverted. By this arrangement, operation of the mower and edge trimmer is achieved with equal facility.

Another object of the invention is to provide novel and improved means for mounting an edge-trimming cutter on a lawn mower in the abovementioned position so that the wheels of the mower combine with the cutter to provide a three-point support facilitating the operation of the cutter.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawing merely shows and the following description merely describes one embodiment of the present invention, which is given by way of illustration or example only.

In the drawing, like reference characters designate similar parts in the several views.

Fig. 1 is a plan view of a lawn mower provided with a lawn edge trimmer according to the present invention.

Fig. 2 is an enlarged broken side elevational view thereof.

Fig. 3 is a similar view showing the mower inverted and the edge trimmer in operative position.

A generally conventional lawn mower is shown in the drawing. The same comprises a pair of transversely spaced wheels 5, having transversely aligned axis of rotation indicated at 25, the wheels being positioned by rigid frame members including the plates 6 connected by the cross bar 12, the cross bar 12 being positioned off center and normally slightly forwardly of the axis of rotation indicated at 25. A rotating grass-cutting blade assembly 7 is driven by the traction wheels 5 in the usual manner. An elongated handle 8 connected by spread arms 9 to the end plate frame element 6 is held centrally between the wheels by said arms, and a trailing roller 10 is mounted on rearwardly extending bracket 11 in the usual manner to regulate the presentation angle of the mower in use. The frame, including the end plate 6 and the cross bar 12, serves in the usual manner as a forward guard for the blade assembly 7. This construction and arrangement is conventional in the art.

According to the invention, an edge-trimming device 13 is mounted on said cross bar 12 and handle 8 adjacent its connection to arms 9. Said device 13 comprises, generally, spaced standards 14 connected to bar 12, a strap 15, connected by a bracket 16 to handle 8, an axle 17 connecting the standards and strap, and a trimmer disc 18 freely rotational on said axle.

The standards 14 are each provided with a bifurcation 19 that straddles over rod 12 and is non-removably held thereon by a set screw 20 that extends through one arm of the bifurcation and impinges on said rod. By this or comparable means, the standards are securely connected to rod 12.

Strap 15 is provided with a fork 21 in which trimmer disc 18 is accommodated, the ends of the latter fork and the ends of standards 14 being apertured for axle 17.

Bracket 16 is fixedly mounted on handle 8 by means of straps 22. Said bracket is preferably metallic and is provided with a notch 23 into which the end of strap 15 extends. A suitable bolt 24, or comparable fastener, connects said strap 15 to bracket 16.

In the above manner, a truss-like frame, comprised of the standards 14, strap 15 and bracket 16, is provided to hold the axle 17 above and forward of the center or axis of rotation 25 of wheels 5 and also locating said axle substantially centrally between wheels 5 and in the plane of handle 8.

Disc 18 simply comprises a thin edge-sharp steel plate and, to limit its penetration in the ground, a hub 26 is provided thereon. Since the disc resides in fork 21, it is located centrally between wheels 5 and is securely held in the mentioned position above said wheels and forward of the centers thereof.

During the normal use of the mower, said trimmer disc, because of its elevated position, is clear of all the operating components of the mower and the latter may be operated in the usual way. The disc 18 is brought into operative positions by a swinging movement of handle 8 around the centers 25 of wheels 5, as shown in Fig. 3. The described relationship of said disc and the mower parts enables handle 8 to have an angle of presentation substantially similar to the angle of said handle in the grass-cutting position of the mower.

The mower, in the trimming position of Fig. 3, has the two wheels 5 and disc 18 in a three-point arrangement at the apices of an isosceles triangle. Therefore, when said disc is pressed into the ground, as when bearing down on handle 8 and thereby raising the wheels 5 off the ground, the device is in balance due to the central position of the cutter 18. Because of the close proximity of the wheels 5 to the cutter, only little angular depression of the handle is needed to raise said wheels whereby the balanced weight of the mower is effective to force the disc 18 into the ground, as desired.

While the invention that has been illustrated and described is now regarded as the preferred embodiment, the construction is of course, subject to modification without departing from the spirit and scope of the invention. It is therefore not desired to restrict the invention to the particular form of construction illustrated and described, but to cover all modifications that may fall within the scope of the appended claim.

Having thus described the invention, what is claimed and desired to be secured by Letters Patent is:

In combination, a lawn mower having a transverse frame including an offset cross bar and traction wheels at the opposite end of said frame, there being an elongated handle extending from said frame; a triangular truss frame comprising a member extending from said cross bar in a direction at right angles thereto and constituting one leg of said truss frame, a member extending between the handle and the outer end of the first member and constituting a second leg of the truss frame, the third leg of said truss frame comprising the portion of the handle that extends between the axis of the frame axles and the point of connection of the second member; an axle at the ends of said members that connect to each other; and a trimmer disc on said axle.

References Cited in the file of this patent

UNITED STATES PATENTS

| Number | Name | Date |
|---|---|---|
| 1,720,169 | Cripe | July 9, 1929 |
| 2,158,580 | Houser | May 16, 1939 |
| 2,483,935 | Ridenour | Oct. 4, 1949 |
| 2,526,317 | Arase | Oct. 17, 1950 |